United States Patent [19]

Kervagoret

[11] Patent Number: 4,982,803
[45] Date of Patent: Jan. 8, 1991

[54] MODULATOR AND POWER-ASSISTED STEERING CIRCUIT COMPRISING SUCH A MODULATOR

[75] Inventor: Gilbert Kervagoret, Argenteuil, France

[73] Assignee: Bendix Europe Services Techniques, Drancy, France

[21] Appl. No.: 525,001

[22] Filed: May 18, 1990

[30] Foreign Application Priority Data

May 31, 1989 [FR] France .................. 89 07144

[51] Int. Cl.$^5$ .............................................. B62D 5/08
[52] U.S. Cl. .................................. 180/132; 180/143; 137/596.12
[58] Field of Search .............. 137/596.12, 501, 596.16; 180/132, 141, 142, 143; 281/129.14, 129.21

[56] References Cited

U.S. PATENT DOCUMENTS 4,096,882 6/1978 Yano et al. ................. 137/596.12
4,561,521 12/1985 Duffy ................................ 180/142

FOREIGN PATENT DOCUMENTS 2537936 6/1984 France .

Primary Examiner—Charles A. Marmor
Assistant Examiner—Kevin Hurley
Attorney, Agent, or Firm—Larry J. Palguta; Ken C. Decker

[57] ABSTRACT

The modulator is intended, under the control of a solenoid valve, for diverting a flow of fluid under high pressure from the fluid supply circuit of a hydraulic motor.

The solenoid valve is a progressively acting solenoid valve, the shutter (70) of which is capable of more or less closing communication between the fluid inlet (56) and the inlet chamber (108) of the regulator as a function of the signal applied to the solenoid valve; furthermore, the spring (116) bears on a piston (132) which closes the regulating chamber (117) and behind which is formed a reaction chamber (128) communicating with the fluid inlet (56).

4 Claims, 2 Drawing Sheets

MODULATOR AND POWER-ASSISTED STEERING CIRCUIT COMPRISING SUCH A MODULATOR

BACKGROUND OF THE INVENTION

The invention relates to a modulator intended for diverting a flow of pressurized fluid from the fluid supply circuit of a hydraulic motor. It also relates to a power-assisted steering circuit for a motor vehicle, the assistance of which is a function of the speed of the vehicle, this circuit employing such a modulator.

The U.S.-Patent Letters 4,561,521 makes known a power-assisted steering circuit of the above-mentioned type, which uses a modulator to divert, when the vehicle is at high speed, some of the pressurized assistance fluid towards the low-pressure fluid reservoir, so as to limit the assistance at high speed. This modulator is composed of a simple electrically controlled piston which may or may not close a port for discharging the fluid towards the low-pressure fluid reservoir.

Such a modulator requires a large actuating device because one of the faces of the piston receives the pressurized fluid permanently.

Furthermore, it is known that, in a power-assisted steering, it is desirable to keep the flow of fluid diverted at a given vehicle speed constant, despite the pressure variations which can come from the feed pump or from the circuit diverted downstream of the modulator, in order to preserve the assistance features. Now the modulator described in the above-mentioned document does not perform any function of regulating the flow.

SUMMARY OF THE INVENTION

The present invention overcomes these disadvantages.

According to a first aspect, the invention relates to a modulator intended for diverting a specific flow of pressurized fluid from the supply circuit of a hydraulic motor, comprising, between a fluid inlet and a fluid outlet, a solenoid control valve and a flow regulator, the latter being composed of a bore, in which a sliding sleeve pierced with a restriction defines an inlet chamber and a regulating chamber, in the wall of which the fluid outlet is made, and a spring arranged in the regulating chamber and opposing the sliding of the sleeve, the skirt of which is capable of closing the fluid outlet.

According to the invention, the solenoid valve is a progressively acting solenoid valve, the shutter of which is capable of more or less closing communication between the fluid inlet and the inlet chamber as a function of the signal applied to the solenoid valve, and the spring bears on a piston which closes the regulating chamber, there being formed behind this piston a reaction chamber communicating with the fluid inlet.

This provides, simply as a result of the actuation of a solenoid valve, a modulator with flow regulation, thereby making the assembly as a whole simple, reliable and economical.

This modulator may also have an auxiliary outlet port made in the bore facing the skirt of the sleeve, in such a way that this auxiliary port is normally closed and is opened in the event of a complete release of the solenoid valve shutter and equalization of the pressures between the inlet chamber and the reaction chamber.

The invention also relates to a power-assisted steering circuit for a motor vehicle, the assistance of which is a function of the speed of the vehicle, comprising a source of pressurized fluid, an assistance device, a vehicle-speed detector, an assistance control unit and a modulator, such as that described above, the control unit supplying the modulator with an electrical signal which is a function of the speed of the vehicle.

BRIEF DESCRIPTION OF THE DRAWINGS

The invention will be better understood and other objects, advantages and features thereof will be more clearly apparent from reading the following description, given by way of a non-limiting example and to which are attached two sheets of drawings in which.

DETAILED DESCRIPTION OF THE INVENTION

Figure 1:
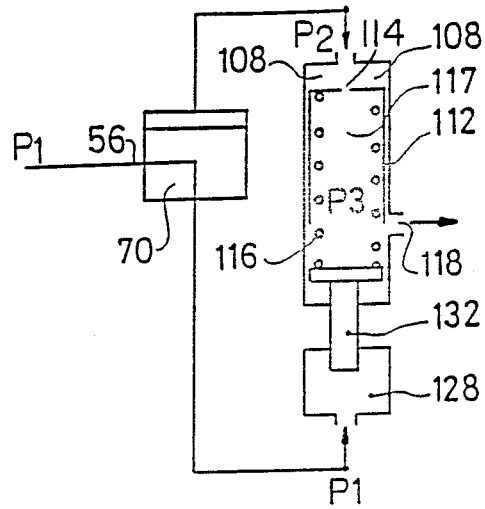
FIG. 1 shows diagrammatically a modulator according to the present invention.

Referring now to the Figures, the modulator according to the invention has been shown in FIG. 1. This modulator comprises a solenoid valve 70 for controlling the flow of fluid to be diverted from the supply circuit (not shown) of a hydraulic motor. The diverted fluid penetrates at the pressure $P_1$, via the inlet 56, into the solenoid valve, the shutter of which more or less closes communication between the inlet 56 and the inlet chamber 108 of the associated regulator as a function of the signal applied to the coil of the solenoid valve. The force of the solenoid valve on this shutter determines the pressure $P_2$ in the inlet chamber 108. The regulator is composed of a bore made in a body. In this bore slides a sleeve 112 equipped with a skirt, pierced with a restriction 114 and loaded by a spring 116 arranged in a regulating chamber 117, one wall of which has a port 118 which forms a fluid outlet and which can be closed more or less by the skirt of the sleeve 112.

The regulating chamber 117 is closed, at its other end, by the end of a piston 132, on which the spring 116 bears. The fluid inlet 56 communicates with a reaction chamber 128, where the other end of the piston 132 projects.

A person skilled in the art will easily understand that, by varying the signal applied to the solenoid valve, this produces a corresponding variation of the pressure $P_2$ in the inlet chamber 108 of the regulator and therefore of the pressure $P_3$ prevailing in the regulating chamber 117. The piston 132, under the effect of the difference between the pressure $P_1$ prevailing in the reaction chamber 128 and the pressure $P_3$ prevailing in the regulating chamber 117, modifies the pre-stress exerted on the spring 116.

This consequently results in a linear relation between the signal applied to the coil of the solenoid valve 70 and the regulated flow of fluid passing through the modulator according to the invention.

It will have been appreciated that, to obtain the desired linear relation, it is sufficient to make a careful selection of the diameter of the piston 132.

Figure 2:
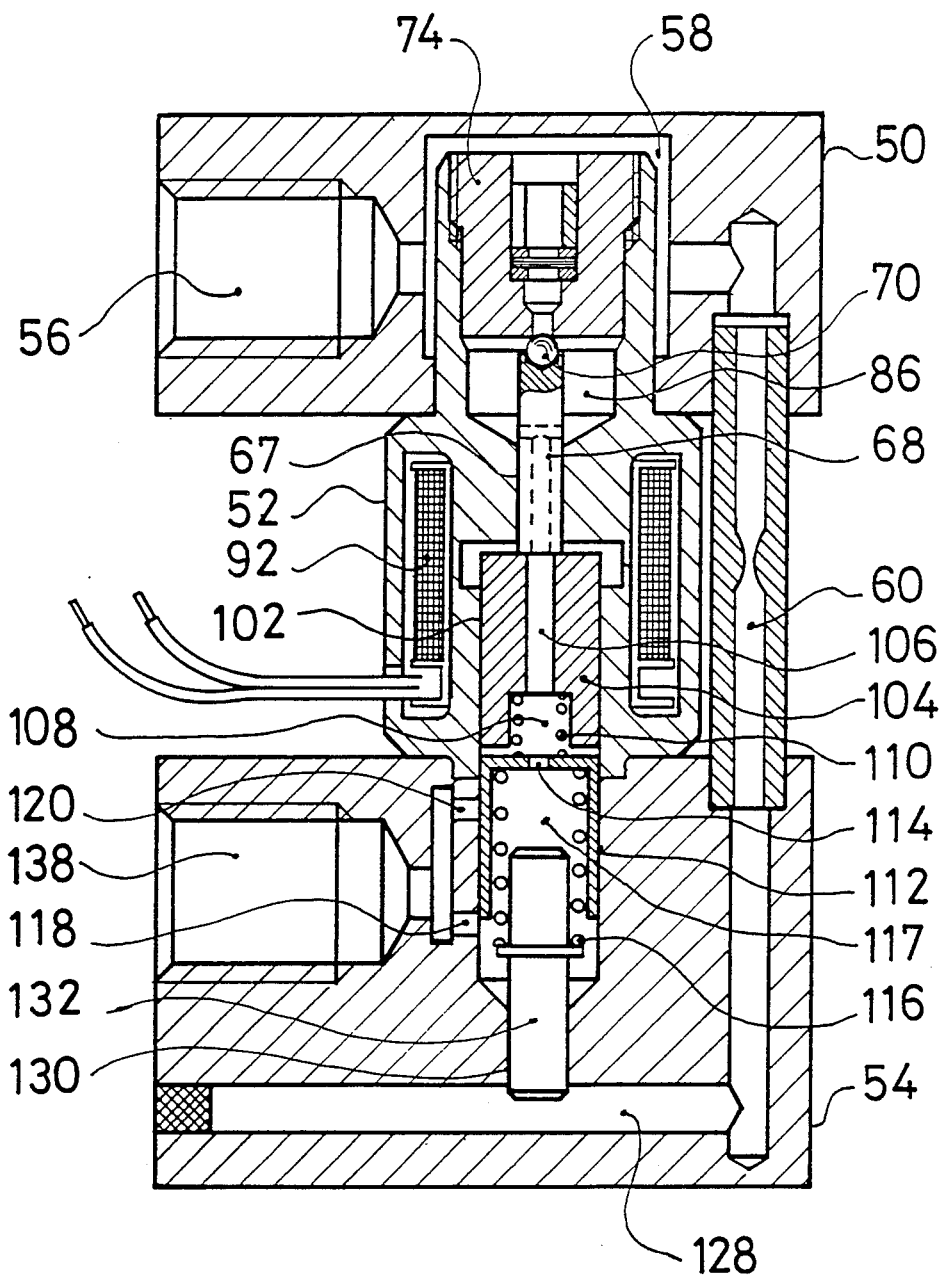
FIG. 2 shows a diagrammatic sectional view of an embodiment of such a modulator.

FIG. 2 illustrates an embodiment of the modulator as shown diagrammatically in FIG. 1. In this FIG. 2, the modulator illustrated is composed of an inlet body 50, a solenoid valve 52 and an outlet body 54.

The inlet body 50 has an inlet 56 for fluid under the pressure $P_1$, communicating, via the chamber 58 and the tube 60 equipped with a restriction, with the reaction chamber 128 in the outlet body 54.

The solenoid valve 52 possesses a bore 67, in which slides a hollow rod 68 carrying a shutter ball 70, the seat of which is formed on a pierced plug 74 connected to the fluid inlet 56.

It also possesses a winding 92 and a magnetic core 104 sliding in a bore 102. An axial duct 106 passes through the magnetic core 104 and defines a chamber 108, in which a spring 110 is seated and which, for example, forms the above-mentioned inlet chamber.

There also slides in the bore 102 a flow-regulating sleeve 112 pierced with a restriction 114 and loaded by a spring 116 arranged in the regulating chamber 117 formed in the bore 102, in such a way that the sleeve 112 is subjected to the opposing action of the two springs 110 and 116. The spring 116 bears, at its end opposite the sleeve 112, on the collar of a piston 132 sliding in a bore 130 made in the outlet body 54. The bore 102 possesses at least one port 118 which can be closed by the lower edge of the skirt of the sleeve 112 and which communicates with an outlet port 138.

On its upper face, the piston 132 receives, in addition to the bearing of the spring 116, the pressure $P_3$ present in the regulating chamber 117 and, on its lower face, receives the pressure $P_1$ of the inlet fluid of the modulator prevailing in the reaction chamber 128 communicating with the fluid inlet 56 via the tube 60 and the chamber 58.

The flow modulator functions as follows: as a function of the signal applied to the winding 92 of the solenoid valve, by way of the core 104 and the hollow rod 68 the force exerted on the ball 70 is controlled and consequently the pressure $P_2$ present in the chamber 86 and propagated as far as the inlet chamber 108 via the hollow rod 68 and the duct 106.

The flow of fluid passing through the restriction 114 of the sleeve 112 causes a loss of head and a pressure $P_3$ in the regulating chamber 117 which is lower than the pressure $P_2$. This flow can subsequently arrive at the outlet port 138 via the port 118.

The flow-regulating sleeve 112, receiving on its upper face the pressure $P_2$ plus the substantially constant force of the spring 110 and, on its lower face, the outlet pressure $P_3$ plus the force of the spring 116, itself subjected to the difference in the pressures $P_1$ and $P_3$ as a result of the effect of the piston 132, closes the port 118 more or less, thereby ensuring a constant flow, the value of which is consequently a function of the signal applied to the winding 92.

On the modulator of FIG. 2, there is, furthermore, an auxiliary port 120 made in the wall of the regulating chamber 117 normally facing the skirt of the sleeve 112. This auxiliary port 120 is therefore normally closed. However, in the event of the complete release of the shutter of the solenoid valve 70, the sleeve closes the outlet port 118 and opens this auxiliary port 120 which communicates with the fluid outlet 138. The position of this auxiliary port 120 is such that it can opened only in the event of the electrical failure of the coil 92 of the solenoid valve, this failure corresponding to a complete opening of the shutter 70, making the pressure $P_2$ substantially equal to the fluid inlet pressure $P_1$.

Figure 3:
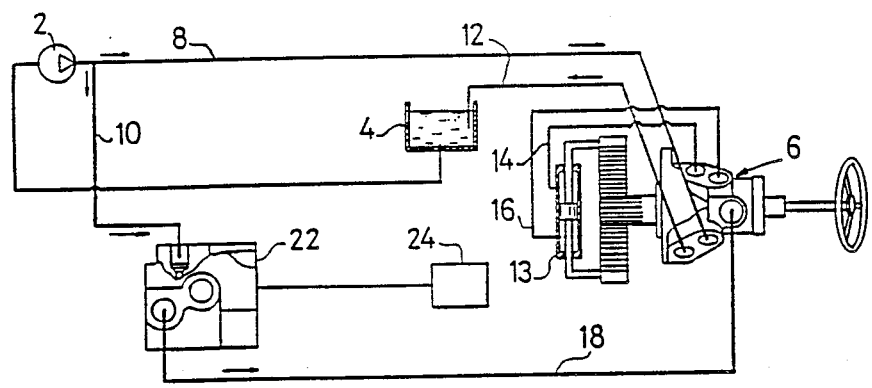
FIG. 3 shows diagrammatically a power-assisted steering circuit comprising such a modulator.

Such a modulator can advantageously equip the power-assisted steering circuit illustrated in FIG. 3. The example shown in FIG. 3 is of a circuit of the type with a double-distribution valve, making it possible to vary the assistance as a function of the speed of the vehicle. It comprises a pump 2 sucking from the reservoir 4 fluid under low pressure which it delivers at high pressure towards a first distribution of the valve 6 via the conduit 8 and towards the modulator 22 via the conduit 10. The first distribution of the valve 6 returns the fluid to the reservoir 4 via the conduit 12 and via the conduits 14 and 16 feeds the steering assistance jack 13 connected to the wheels (not shown). A second distribution receives a flow diverted by the modulator via the conduit 18 and returns the fluid to the reservoir via the conduit 12.

The control unit 24 controls the modulator 22 and receives information, such as the speed of the vehicle, by means of detectors (not shown).

In a way known per se, at low speed the modulator diverts only very little fluid, thus ensuring maximum assistance by means of the jack 13. In contrast, at high speed, this modulator diverts a very large flow of fluid and the jack 13 is virtually no longer fed at all.

Nevertheless, by means of the second distribution, at high speed, a pronounced movement of the steering wheel can be assisted by a throttling of the diverted flow and consequently a rise of pressure in the first distribution.

Figure 4:
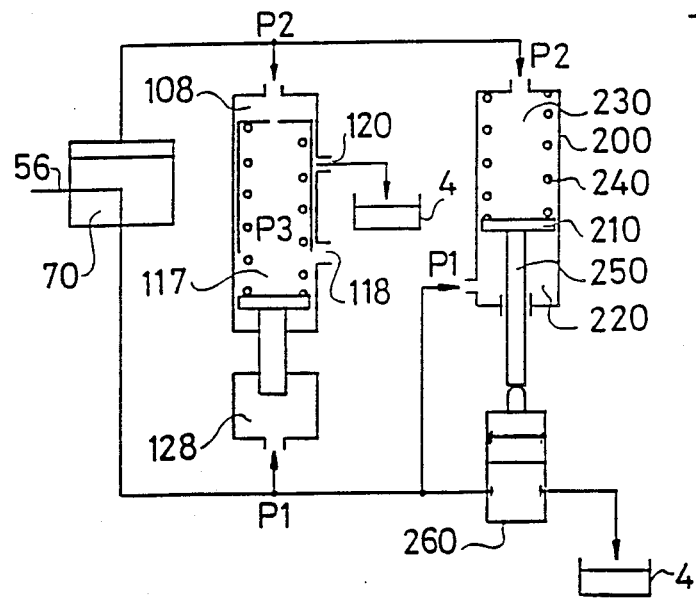
FIG. 4 shows diagrammatically a modulator intended for a power-assisted steering circuit and comprising an additional valve for the high speeds.

So as to divert as much pressurized fluid as possible at high speed, an auxiliary short-circuiting device can be added to the modulator, as shown in FIG. 4. An auxiliary bore 200 is provided, for example, in the body of the modulator. In this auxiliary bore 200 slides a piston 210 defining a front chamber 220 and a rear chamber 230. The front chamber 220 is connected to the fluid inlet 56, whilst the rear chamber 230 is connected to the inlet chamber 108 of the regulator. A spring 240 arranged in the rear chamber 230 balances the piston 210. The latter is equipped with a pusher 250 controlling a valve 260 having two specific states. When this device is at rest, the shutter of the valve 260 is closed and does not allow any communication between the fluid inlet 56 of the modulator and the reservoir 4. When the difference in the pressures prevailing in the front and rear chambers 220 and 230 is greater than a specific threshold, that is to say at a high speed of the vehicle, the shutter of the valve 260 opens and the fluid at the inlet port 56 is conveyed directly to the reservoir 4. The assistance to the vehicle steering is thus greatly reduced.

What we claim is:

1. A modulator intended for diverting a specific flow of fluid under high pressure from a supply circuit of a hydraulic motor, said modulator comprising, between a fluid inlet and a fluid outlet, a solenoid control valve and a flow regulator, said flow regulator being composed of a bore, in which a sliding sleeve pierced with a restriction defines an inlet chamber and a regulating chamber, in a wall of which said fluid outlet is made, and a spring arranged in said regulating chamber and opposing the sliding of said sleeve, a skirt of said sleeve capable of closing said fluid outlet, said solenoid valve being a progressively acting solenoid valve, a shutter of which is capable of approximately closing communication between said fluid inlet and said inlet chamber of the regulator as a function of a signal applied to said solenoid valve, and said spring bearing on a piston which closes said regulating chamber and behind which is formed a reaction chamber communicating with said fluid inlet.

2. The modulator according to claim 1, wherein an auxiliary outlet port is made in said bore facing the skirt of said sleeve, in such a way that the auxiliary outlet port is normally closed and is opened in the event that pressure in said inlet chamber is equal to that of said reaction chamber.

3. A power-assisted steering circuit for a motor vehicle, assistance of which is a function of speed of the vehicle, comprising a source of fluid under high pressure, an assistance device, a vehicle-speed detector, a control unit for said assistance, and a modulator intended for diverting a specific flow of fluid under high pressure from the supply circuit of the assistance device, said modulator comprising, between a fluid inlet and a fluid outlet, a solenoid control valve and a flow regulator, said flow regulator being composed of a bore, in which a sliding sleeve pierced with a restriction defines an inlet chamber and a regulating chamber, in a wall of which said fluid outlet is made, and a spring arranged in said regulating chamber and opposing the sliding of said sleeve, a skirt of which is capable of closing said fluid outlet, said solenoid valve being a progressively acting solenoid valve, a shutter of which is capable of approximately closing communication between said fluid inlet and said inlet chamber of the regulator as a function of the signal applied to said solenoid valve, and said spring bearing on a piston which closes said regulating chamber and behind which is formed a reaction chamber communicating with said fluid inlet , said outlet port being connected to a low-pressure fluid reservoir, said control unit supplying said solenoid valve with an electrical signal which is a function of the speed of the vehicle.

4. The circuit according to claim 3, wherein said modulator possesses an auxiliary bore, in which a piston defines a front chamber and a rear chamber, to which said fluid inlet and said inlet chamber are respectively connected, said piston being equipped with a pusher making it possible to open communication between said fluid inlet and said low-pressure reservoir when the difference between the pressures prevailing in said front and rear chambers exceeds a threshold determined by a spring arranged in said rear chamber.

* * * * *